(12) United States Patent
Garland

(10) Patent No.: US 6,861,970 B1
(45) Date of Patent: Mar. 1, 2005

(54) WEARABLE VIBRATING RADAR DETECTION DEVICE

(76) Inventor: Michael Patrick Garland, 48 Timberlake Trail East, Oswego, IL (US) 60543

( * ) Notice: Subject to any disclaimer, the term of this patent is extended or adjusted under 35 U.S.C. 154(b) by 0 days.

(21) Appl. No.: 10/304,102

(22) Filed: Nov. 25, 2002

(51) Int. Cl.$^7$ ................................................ G01S 7/40
(52) U.S. Cl. ........................... 342/20; 342/56; 342/175; 342/176; 343/718
(58) Field of Search ............................ 342/20, 51, 56, 342/146, 147, 175, 176; 340/500, 539.1, 539.13, 539.32, 572.1, 573.4, 573.1, 573.6, 604, 691.6; 455/100, 277.1, 344, 346, 348; 343/702, 718, 898; 2/410, 901, 906, 909

(56) References Cited

U.S. PATENT DOCUMENTS

| | | | |
|---|---|---|---|
| 3,660,844 A | | 5/1972 | Potter |
| 4,181,910 A | | 1/1980 | Hitterdal |
| 4,673,936 A | * | 6/1987 | Kotoh ........................... 342/51 |
| 4,719,462 A | | 1/1988 | Hawkins |
| 4,725,840 A | | 2/1988 | Orazietti |
| 4,906,999 A | * | 3/1990 | Harrah et al. .................. 342/20 |
| 5,005,661 A | | 4/1991 | Taylor et al. |
| 5,034,747 A | | 7/1991 | Donahue |
| 5,049,884 A | | 9/1991 | Jaeger et al. |
| 5,049,885 A | | 9/1991 | Orr |
| 5,114,060 A | | 5/1992 | Boyer |
| 5,525,967 A | * | 6/1996 | Azizi et al. .............. 340/572.1 |
| 5,525,989 A | | 6/1996 | Holt |
| 5,668,554 A | * | 9/1997 | Orr et al. ...................... 342/20 |
| 5,684,488 A | | 11/1997 | Liautaud et al. |
| 5,781,145 A | | 7/1998 | Williams et al. |
| 5,900,817 A | * | 5/1999 | Olmassakian ............ 340/573.1 |
| 6,005,525 A | * | 12/1999 | Kivela ......................... 343/702 |
| 6,043,771 A | * | 3/2000 | Clark et al. .................... 342/13 |
| 6,049,301 A | * | 4/2000 | Weagant ....................... 342/13 |
| 6,384,776 B1 | * | 5/2002 | Martin .................. 342/357.09 |
| 6,486,777 B2 | * | 11/2002 | Clark ....................... 340/539.1 |
| 2001/0050613 A1 | * | 12/2001 | Clark ......................... 340/539 |

FOREIGN PATENT DOCUMENTS

WO    WO-93/25875    * 12/1993

OTHER PUBLICATIONS

"Technology developments in the RF tracking and locating of personnel and objects", Loubert, G.; Security Technology. Crime Countermeasures, Procs. Institute of Electrical and Electronics Engineers 1992 Int'l Carnahan Conf. on , Oct. 14–16, 1992, Ps: 206–212.*

* cited by examiner

Primary Examiner—John B. Sotomayor
(74) Attorney, Agent, or Firm—Michael I. Kroll

(57) ABSTRACT

A detection device is described configured for receiving radar and laser signals. The detection device is a self contained stand alone assembly having a watch like configuration and positionable on an arm of a vehicular driver such as a motorcyclist. The detection device is a warning receiver configured to receive signals, identify the signals as being in frequency bands for vehicular speed measuring systems used in law enforcement, and providing a warning to the vehicular driver. In addition, the detection device is configured for calculating the angle and distance from the detection device to the source of the speed measuring system.

9 Claims, 5 Drawing Sheets

WEARABLE VIBRATING RADAR DETECTION DEVICE

BACKGROUND OF THE INVENTION

1. Field of the Invention

The present invention relates generally to warning receivers for signals emitted by vehicular speed measuring systems and, more specifically, to self contained devices configured for detecting and indicating the reception of signals in the bands emitted by vehicular speed measuring systems.

2. Description of the Prior Art

Radar was developed during World War II for the detection and acquisition of targets such as aircraft, ships, and submarines. Since then, radar has been applied in a wide variety of differing military and commercial applications such as those by law enforcement to measure the speed of vehicles and determine whether they are within the designated speed limit. In addition, laser range finders, another well established military technology, has been adapted for commercial applications, such as those for surveying, and is now also employed by law enforcement officers for measuring the speed of vehicles.

As a result of the applications of military technology by law enforcement to enforce speed limits, sensing devices for detecting radar and laser signals have proliferated. A sizable percentage of these devices are configured for the unique requirements of motorcycle applications. The sensing devices warn the motorcyclist of the presence of speed measuring systems so that motorcyclists can verify and adjust their current speed, as required, relative to the speed limit.

A radar detector and identifier device is described configured for being carried and used by persons, such as military personnel, to warn them when they are being illuminated by radar, to provide such persons with the capability of roughly determining the direction from which the radar illumination is coming, and especially to provide them with the capability of identifying the radar signal as originating from an enemy or a friendly source by identifying certain characteristics of the radar signal itself such as its pulse repletion frequency and its pulse width. Potter, however, is limited by its inability to detect the distance to the radar emitter and the exclusion of a laser detection device.

Hitterdal teaches a hand carried radar-detecting control box configured as a receiver and indicator. An antenna is connected by a short coaxial line to a radar broadband detector. A flexible transmission line connects the detector/indicator to the remain ing receiver circuitry including electronic components such as an amplifier, a limiter, a multivibrator, and tone generator positioned in the pocket sized control box. The tone generator drives an earphone. Hitterdal, is limited by not including any laser detection or direction finding capability. Further, Hitterdal has a separately positioned antenna and receiver circuitry distinct from the pocket sized control box.

A superheterodyne radar detector includes a compact watertight and durable housing to which a variety of clips and fastening means may be attached. Batteries are provided for powering the radar sensing circuitry, as well as means for recharging and/or replacing batteries. Two antenna horns are mounted within the housing directed perpendicularly with respect to one another and a shield is provided for mounting over one of the two antenna horns. The device is positionable in a pocket of the wearer. A sensed radar signal is indicated by an earphone and/or an indicator light and/or a speaker. Orazietti, however, lacks a laser detector and a capability for noting the direction of the radar pulse.

A motorcycle mounting for a radar speed monitor in which the visual indicator or monitor can be readily mounted and removed. The monitor is connected to a radar transmitter/receiver positioned in the motorcycle structure by a cable. The motorcycle mounting for the monitor includes a first support member with releasable strap for holding a radar monitor in position, second support members extending from each side of the first support member, each being attached at its upper end to the first support member, clamps may be used at the lower end of each second support member for attachment of the lower end of each second support member to the handlebar of a motorcycle; a mounting bracket is also included for positioning a radar transmitter/receiver on the motorcycle. Taylor et al. is limited as a result of teaching a relatively complex permanent structural addition for mounting a two component radar detection system.

A detachable radar unit for a motorcycle unit is taught. An outer shell is permanently attached to the side of a motorcycle helmet. A radar sensing unit may be inserted into the shell, making electrical contact with a microphone and light panel for communicating the status and alerts of the unit are attached to the helmet. The radar sensing unit may also be detached from the helmet and attached to a car or boat by using separate shells permanently mounted on the car or boat. A special quick disconnect plug in the unit's power supply cord is provided which quickly and easily disconnects the helmet from the motorcycle should the need arise. Donahue has separate components having separate physical locations for sensing and visual indication. Further, Donahue fails to teach a laser sensor system.

An apparatus configured for securely mounting a compact, commercially available radar detector unit on either the handlebars or fairing of a motorcycle. The apparatus provides a sealed chamber configured for removably receiving the detector unit. The chamber includes shock absorbing devices, configured to reduce the vibrations levels on the receiver, and a mounting assembly. The mounting assembly is configured to accommodate positioning the unit on the motorcycle handlebars in various angular orientations. This enables the apparatus to be used on motorcycles with handlebars having widely varying rake angles. Boyer fails to teach an apparatus such as radar or a laser detection system.

A helmet and radar detector integration system is described comprising a radar and laser detector connected to a light cluster array positioned in the helmet of the motorcycle rider. The light cluster array, when illuminated, is reflected off the transparent windshield of the helmet and into the eyes of the person. When the radar laser detector illuminates the light cluster array, the person can safely look out through the helmet without any visual obstructions. A structure is included for mounting the radar laser detector onto a motorcycle. Holt, however, is limited by its separate components and mounting systems on the motorcycle and in the helmet which create an undesirable connection between the helmet and the detector positioned on the cycle. Further, Holt lacks the capability for determining and indicating the directional source of the speed sensor emitter.

A radar/laser speed detection countermeasure device configured for use on a motorcycle is disclosed which detects and annunciates the receipt of radar and/or laser based speed detection signals. The device consists of a main detector body mounted in an interior cavity of a motorcycle, which is electrically connected to a remote mounted sensing head unit and a remote mounted indication and control panel. The main detector body includes a speaker for communicating the receipt of radar/laser signals. Hidden components and interconnecting wiring reduce the chance of theft and preserve the appearance of customized motorcycles. Williams et al. is limited by its utilizing two separately positioned components for detection and the main detector body. While Williams et al. provides for radar/laser detection it does not provide directional indication of the source of the radar/laser. Further, Williams et al. is configured to reduce its vulnerability to theft, the device remains positioned on the motorcycle and is therefore limited to being damaged or stolen.

It is desirable to have a compact radar/laser detection device that is self contained and can be positioned as a single component directly on a motorcyclist. It is further advantageous for the motorcyclist to receive indication of receiving signals in the bands of vehicular speed measuring systems using sensors that do not require the vehicular driver to take their eyes off the road. It is still further desirable to indicate the general directional location and distance to the source of the radar/laser.

A continuing need exists for a stand alone radar/laser detector system that can be positioned directly on the motorcyclist, detect radar and laser signals, and indicate signals from speed measuring systems without visually or aurally distracting the motorcyclist, and provide warning of the direction and distance to the source of the radar/laser.

A primary object of the present invention is to provide a stand alone wearable radar detection device positioned in a housing that will provide indication to a vehicular driver of receiving signals in the bands of speed measuring systems.

Another object of the present invention is to provide a wearable radar detection device that is strapped to a limb of the vehicular driver.

Still another object of the present invention is to provide a wearable radar detection device that vibrates when the radar receiver detects radar and laser signals at least in designated bands.

Yet another object of the present invention is to provide a wearable vibrating radar detection device configured for acquiring data suitable for calculating and displaying distance and direction information from the detection device to the source of the signal and effectively the speed measuring system.

Still another object of the present invention is to provide a wearable vibrating radar detection device that will respond to a plurality of radar bands including KA, X and pulse as well as the LIDAR laser band.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

DESCRIPTION OF THE REFERENCED NUMERALS

Turning now to the reference numerals used, the following numbering is used throughout the various drawing figures:

10 Wearable vibrating radar detection device
20 housing assembly for 10
22 housing
23 housing face
24 first side of the housing
25 second side of the housing
26 third side of the housing
27 fourth side of the housing
30 receiver
32 radar sensor
34 laser sensor
50 microprocessing group
51 power group
52 battery/power source
53 power switch
54 processing group
55 microprocessor
56 comparator
57 operational mode group
58 city setting switch
58A city setting indicator
59 highway setting switch
59A highway setting indicator
70 indicator group
72 vibrating mechanism
74 azimuth to speed measuring system indicator
76 distance to speed measuring system indicator
100 speed measuring system
110 radar speed measuring system
115 radar signal from 110
120 laser speed measuring system
125 laser signal from 120

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
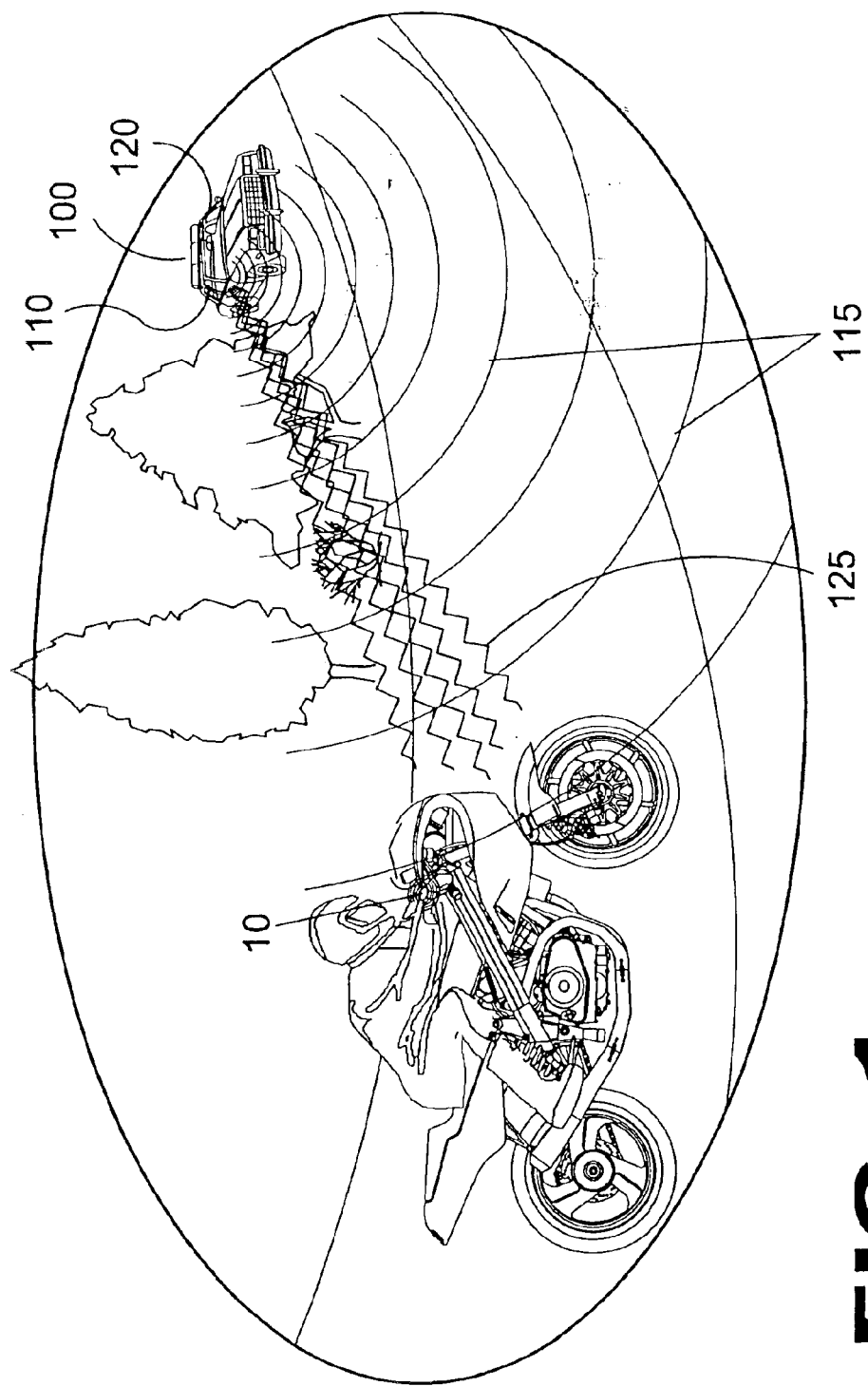
FIG. 1 is an illustrative view of a wearable vibrating radar detection device constructed in accordance with the present disclosure positioned on a motorcyclist.

FIG. 1 depicts the wearable vibrating radar detection device or detection device 10 positioned on a vehicular driver such as, but not limited to a motorcyclist. Detection device 10 is a stand alone assembly configured for detecting, classifying, and processing signals from a vehicular speed measuring system 100. Stand alone device as defined herein being a self powered and self contained system. Vehicular speed measuring system 100 includes devices such as, but not limited to radar devices 110 and/or laser devices 120 typically positioned in police cruisers.

Detection device 10 is a discrete warning receiver configured to notify the vehicular driver when radar signals 115 and laser light signals 125 are detected from vehicular speed measuring devices 100. In addition, detection device 10 can determine an azimuth and a distance from detection device 10 to measuring system 100.

Figure 2:
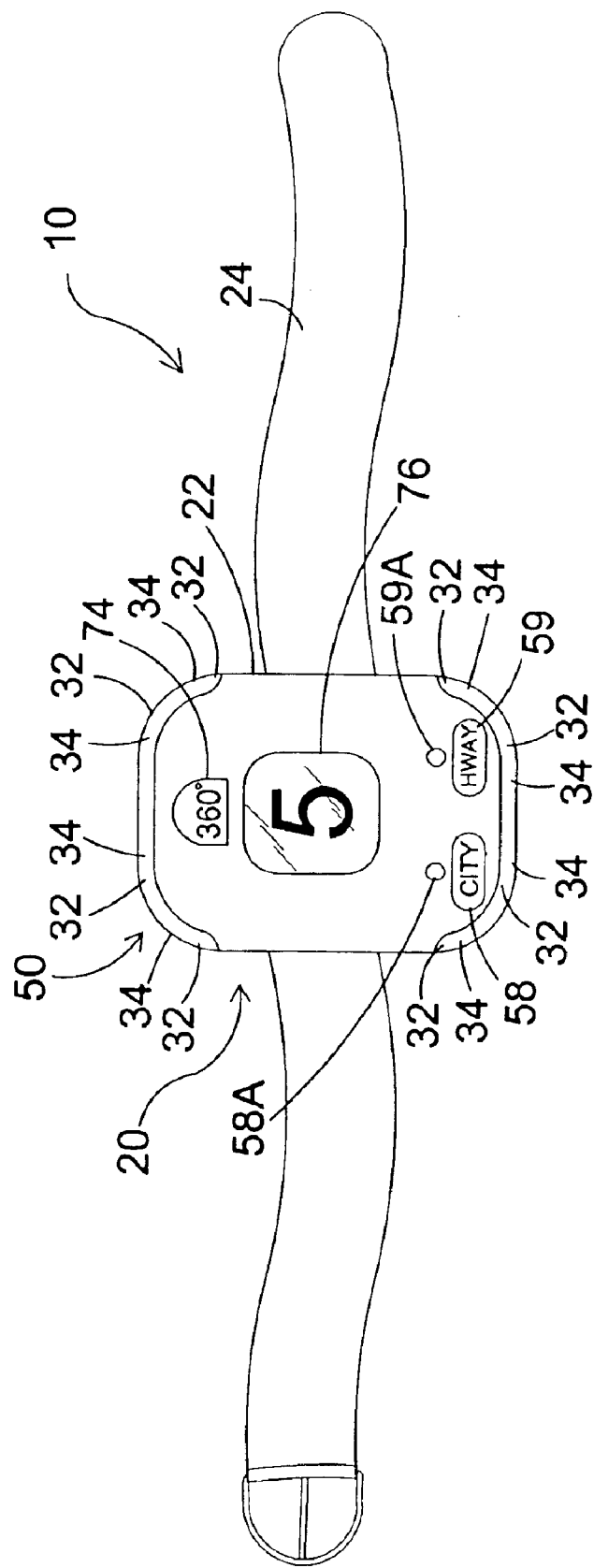
FIG. 2 is a top view of the vibrating radar detection device of FIG. 1.
Figure 3:
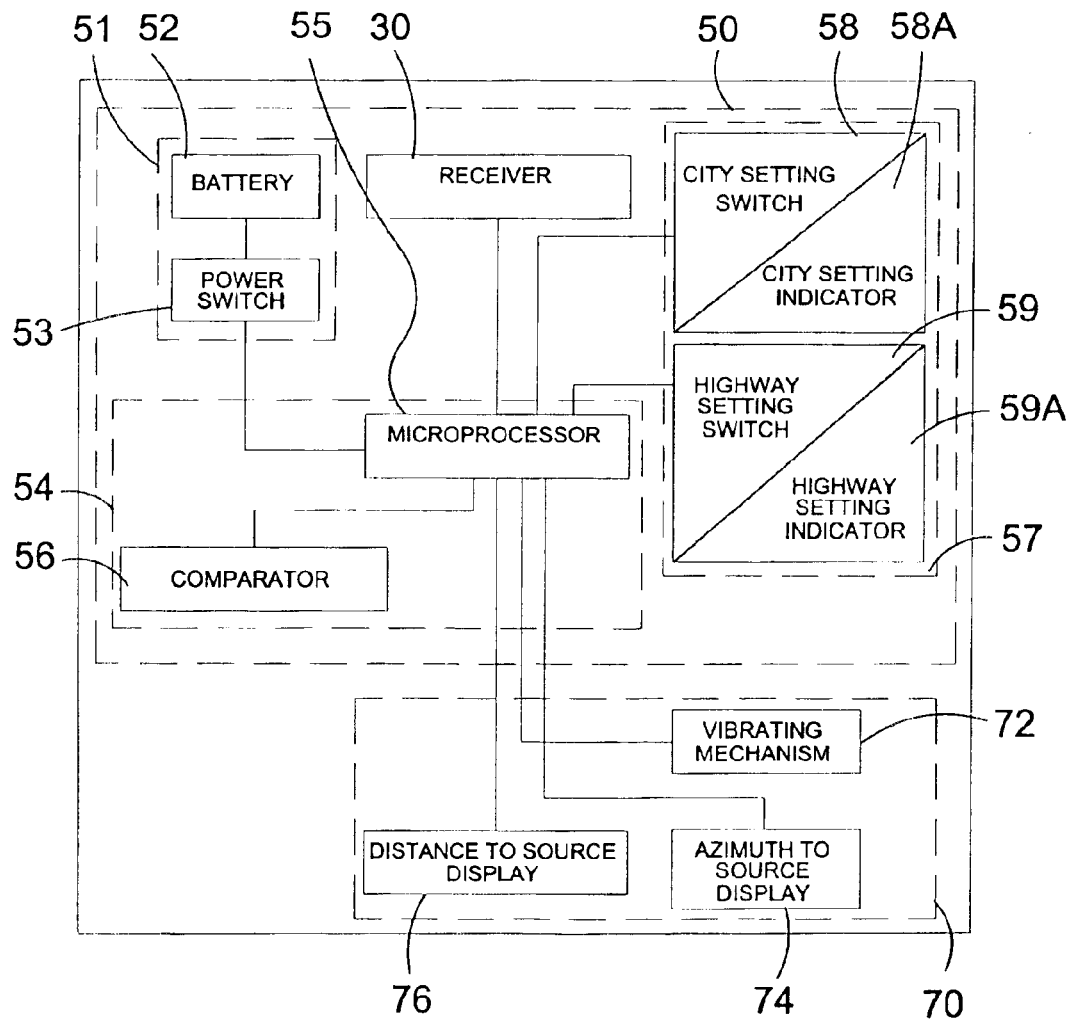
FIG. 3 is a simplified block diagram of the vibrating radar detection device of FIG. 1.
Figure 4:
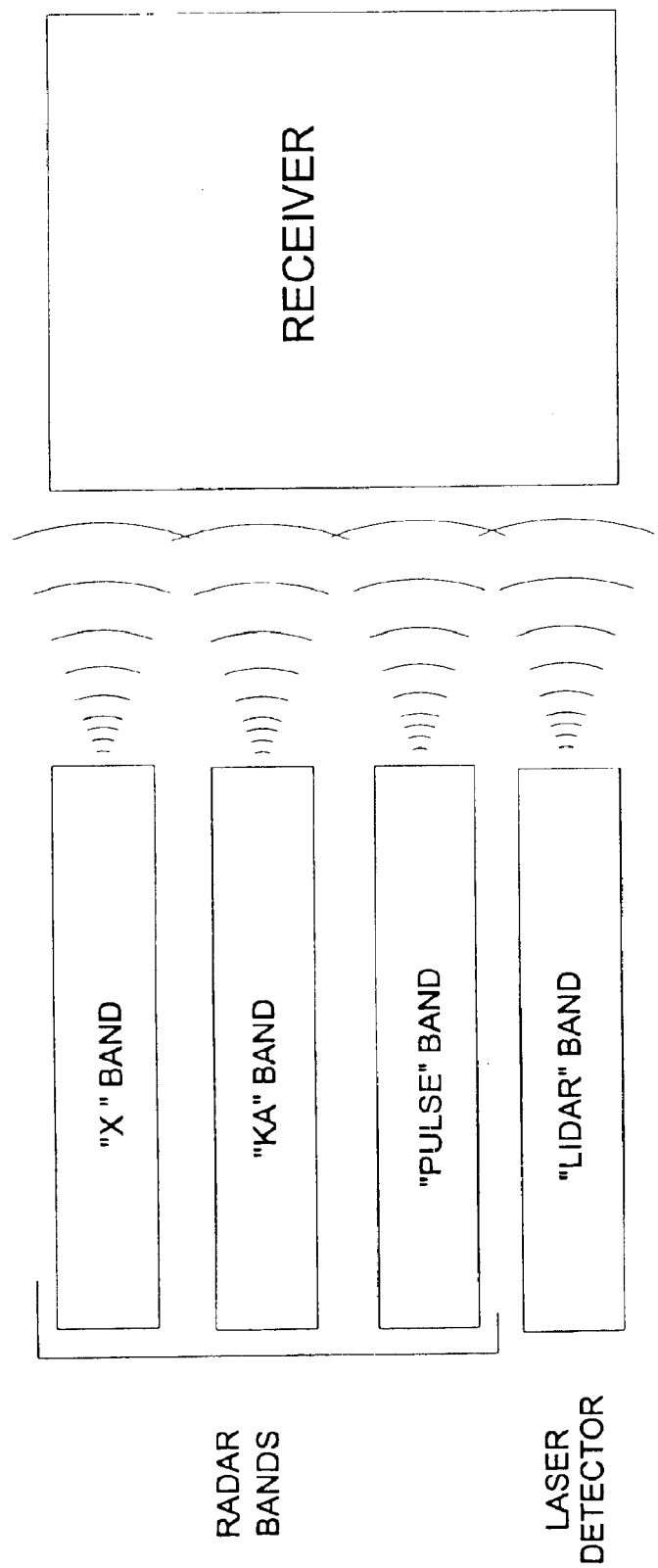
FIG. 4 is a simplified block diagram of radar and laser bands detectable by the receiver of the radar detection device of FIG. 1.
Figure 5:
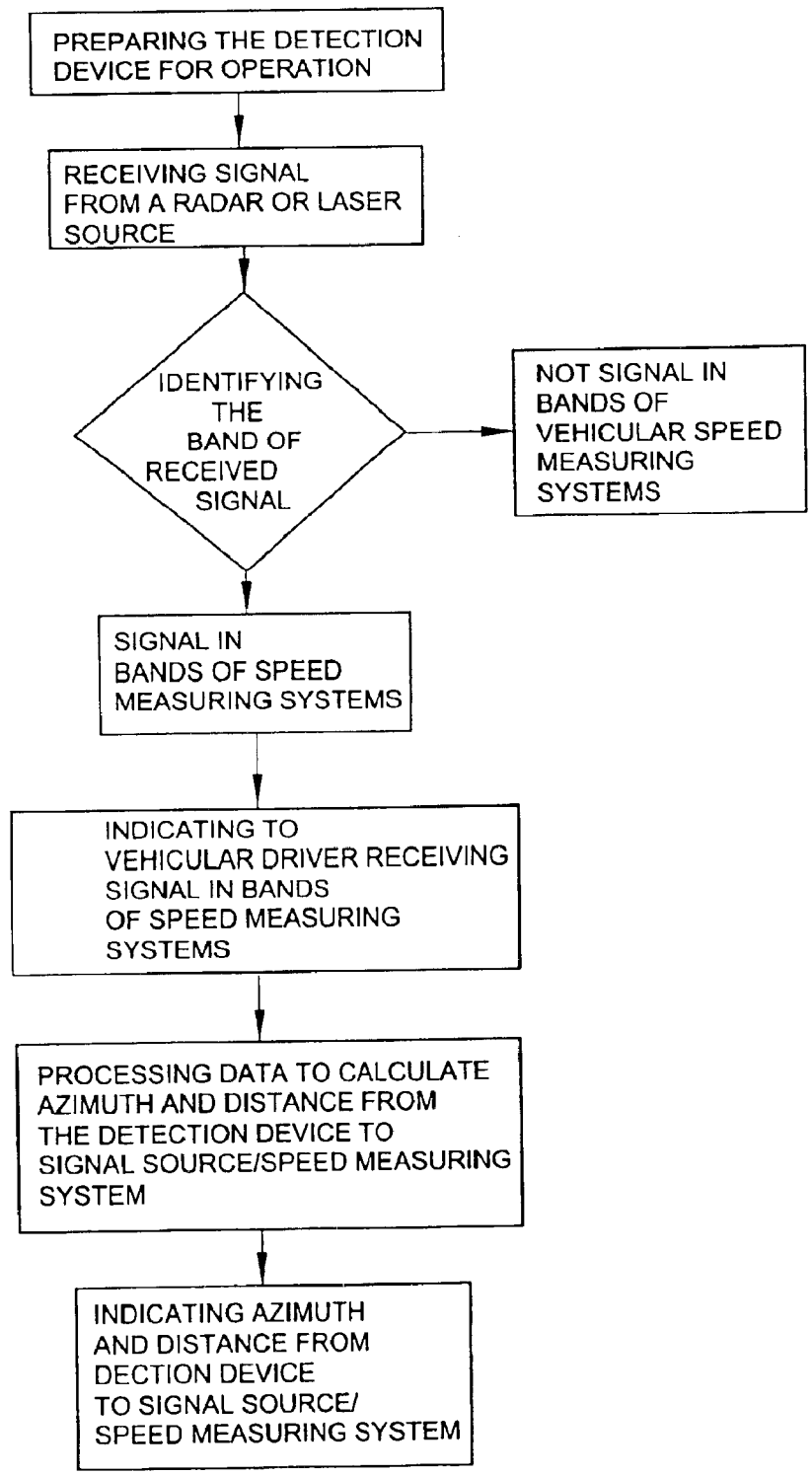
FIG. 5 is a block diagram of a method for using a vibrating radar detection device in accordance with the present disclosure.

FIG. 2 shows detection device 10 in one preferred embodiment configured as a watch-like device positionable on a wrist of the wearer. Detection device 10 includes a housing assembly 20, a receiver 30, a microprocessing group 50, and an indication system 70.

Housing assembly 20 includes a housing 22 connected to an attachment means 24. Housing 22 includes a top or face 23, a bottom (not shown), a first side 24, a second side 25, a third side 26, and a fourth side 27. Housing assembly 20 is suitable for use in environmental conditions including driving rain, high vibration, and temperature extremes experienced by positioning detection device 10 on an outer garment of a motorcyclist. In particular, housing 22 is configured as a waterproof container. In this one embodiment housing 22 has four sides, but housing 22 could take any shape suitable for the positioning of receiver 30, microprocessing group 50, and indicator system 70.

In this one preferred embodiment, attachment means 28 is a wrist band 29 having an adjustable buckle connector system, but it can also include, for example, a range of attachment devices such as, but not limited to a biased band or clamping mechanisms for attachment to a sleeve, strap, or pocket.

Referring now to FIGS. 1–4, receiver 30 includes a plurality of sensors 32 and 34 configured for detecting the presence of specific ranges of radar signal frequencies and laser light, respectively. Sensors 32 are antennas tuned to bands associated with radar measuring systems 100. Similarly, sensors 34 are laser light or signal detectors tuned to the radar and laser bands of measuring systems 100. Sensors 32 and 34 are strategically positioned on face 23, bottom (not shown), first side 24, second side 25, third side 26, and fourth side 27 for the detection of incoming radar signals 115 or laser signals 125 from any directional angle.

Sensors 32 in th is one preferred embodiment are configured for detecting radar 110 signals in the "X" band, "KA" band, "Pulse" band. Laser sensors 34 are configured to detect laser signals 125 in the "Lidar band." Signals not within these bands of sensors 32 and 34 are discarded by detection device 10. Detection device 10 is configured for being updated for new bands and, as required, new or revised sensors 32 and 34 for detecting the new bands.

Microprocessing group 50 is positioned in housing 22 and includes a power group 51, a processor group 54, and an operational mode group 57. In addition, microprocessing group 50 is connected to indicator system 70 and receiver 30.

Power group 51 includes a source of electrical power such as a battery 52 and an on/off power switch 53. Power switch 53 is connected to processor group 54. Battery 52 has a suitable long life for sustaining detection device 10 for an extended period of operation. Battery 52 also includes a function for detecting low voltage level and providing an indication to the wearer of a discrete pulsed vibration at distinct intervals identifying a limited remaining life of the battery to the wearer. Battery 52 can be a rechargeable battery using recharging means or a single use disposable power source.

Processor group 54 includes one or more microprocessors 55 receiving input from at least receiver 30 and control group 50. Processor group 54 also includes a comparator 56 configured to analyze the signals received by receiver 30 and identify those signals originating in the frequency ranges of vehicular speed measuring devices 100. In addition, processor group 54 activates indicator system 70 to provide detection, azimuth, and range warnings to the wearer. Microprocessor 55 includes a clock having suitable precision for the measurement of the arrival of radar and laser signals at the plurality of sensors 32 and 34.

Microprocessor group 54, including comparator 56 and microprocessor 55, in combination with receiver 30 function to determine the time difference of arrival and/or phase difference of arrival as received by the separately positioned plurality of sensors 32 and 34 on housing 22.

The time differences of arrival and/or phase difference of arrival parameters are measured as distinct individual events over time as detection device 10 moves at a velocity on the motorcycle defining a track on the ground. The varying time difference parameters are stored and analyzed to determine azimuths from device 10 to measuring system 100.

In order to calculate distance, a micro electromechanical accelerometer system integrated with microprocessing group 54 measures the relative acceleration of device 10 in up to three dimensions along the vehicular track. Microprocessor 55 identifies at least two points on the track having suitably distinct azimuths to measuring system 100 while radar signals 115 and/or laser signals 125 are being received. Based on these para meters the velocity and distance traveled is calculated simultaneous with the storing of the time difference parameters.

Given the known distance between the points and the azimuths defined from the points to measuring system 100, the geometry and distance parameters suitable for triangulation have been defined. The triangulation calculation is performed and the distance to measuring system 100 is provided to indicator system 70 for display. This distance information, for example, can also be updated to compensate for the ongoing velocity of device 10 positioned on the motorcycle.

Detection device 10 is also configured to adapt to the dynamic positioning of measuring system 100 and still provide an estimated azimuth indication relative to measuring system 100.

The approximation of a dynamic vehicular speed measuring system 100 signal can also be calculated utilizing the rate of change of the signal power or intensity. For example, when the signal power and/or intensity are increasing relative to the wearer, device 10 can be programmed to initiate an additional or heightened state of indication using indicator system 70.

Operational mode group 57 includes selectable switches for a city mode 58 and a highway mode 59 of operation. Switches 58 and 59 have corresponding LED type indicators 58A and 59A which are lit upon selecting the corresponding mode. City mode 58 couples the signals from receiver 30 to additional filtering in microprocessor group 54 configured to discriminate between erroneous or relatively weak radar signals 115 or laser signals 125 refracted by the reflective environment of the city. Highway mode 59 has increased sensitivity relative to city mode 58 for the detection of measuring system 100 from greater distances.

Indicator system 70 includes a vibrating mechanism 72, a directional indicator 74, and/or a distance indicator 76.

Vibrating mechanism 72 is activated by microprocessor 55 after comparator 56 has confirmed the signal as an emission in the band of or effectively from measuring systems 100. Vibrating mechanism 72 is a conventional device for providing vibrations having an amplitude and frequency suitable for penetrating through a sleeve of a jacket and providing an identifiable tactile indication to the wearer. Vibrating mechanism 72 can also communicate additional warnings, as noted previously, such as low battery voltage, communicate the status of detection device 10 by diagnostic vibrations to validate the operational status to the wearer, or, for example, provide discrete vibrations for the detection of laser signals 125 versus radar signals 115.

Directional indicator 74 is a visual display device configured for receiving a directional electronic signal from microprocessor 55 indicating the relative position of vehicular speed measuring device 100 and displaying to the wearer the directional orientation of the vehicular speed measuring signals being received. In this one preferred embodiment the visual display is configured for numeric characters indicating the position of the strongest vehicular speed measuring device 100 signal using the 360 degrees of a circle for orientation. Directional indicator 74 preferably uses Light Emitting Diodes (LEDs) or another similar highly reliable form of light emitting indicating device suitable for providing clearly discernable indications in conditions of bright sunlight and night.

Alternative configurations of directional indicator 74 include a dial indicator having a pointer or hand and light indicators positioned at the approximate hours of a clock. The dial indicator includes one or more LEDs configured to rotate through 360 degrees to orient in the direction of the origin of the vehicular speed measuring device 100 signal. The hour point visual indicators are LEDs positioned at the different positions of hours points around the perimeter of face 23. The hour points are LED type devices that illuminate pointing in the direction of the origin of vehicular speed measuring device 100 signal.

Distance indicator 76 is a preferably a LED type indicating device having a standardized measuring system based on selectable options such as, for example, 100 yard, mile, 100 meter, or kilometer increments. Distance indicating signals are received from microprocessor group 54. It is also envisioned that directional indicator 74 and distance indicator 76 can be combined into a single indicator.

Referring now to FIGS. 1–5, the detection device 10 is prepared for operation by attaching to a vehicular driver such as a motorcyclist. The attachment means is preferably configured for securely attaching to the motorcyclist's wrist and turning the power switch to the on position. The desired operational mode, either highway or city, is selected.

As the motorcyclist is riding, radar sensors 32 and laser sensors 34 are positioned on the wrist of the motorcyclist for detecting signals such as radar signals 115 or laser signals 125. Received signals are forwarded to microprocessing group 54 where they are analyzed to determine if they fall within the designated bands. If the signals fall within the designated KA, X, and pulse radar bands as well as the LIDAR laser band, detection device 10 responds to the presence of the signal by actuating vibrating mechanism 72 alerting the rider of the presence of radar signals 115 or laser signals 125 in the bands of vehicular speed measuring devices. If the signals are outside of the designated bands no warning is provided.

Once signals are identified as effectively originating from speed measuring system 100, microprocessing group 54 uses the received signal data and internal data, such as that from accelerometer system, to calculate and send electronic signals representing the azimuth and the approximate distance to measuring system 100 from device 10 to indicator system 70. Representations of the azimuth and distance to measuring system 100 are then displayed by indicators 74 and 76, respectively.

It is understood the term vehicle used herein encompasses not only automobiles, but vehicles such as but not limited to motorcycles, ski mobiles, jet skis, and boats.

What is claimed as new and desired to be protected by letter patent is set forth in the appended claims:

1. A warning receiver adapted for sensing signals in the bands of vehicular speed measuring systems comprising:

a self contained detection device positioned in a housing, the housing being connected to attachment means, said housing being in a watch-like configuration adapted to be secured on a wrist of a user;

a receiver positioned in the housing, the receiver including a plurality of sensors adapted for at least receiving signals in the bands of vehicular speed measuring systems, said sensors being strategically positioned on a face, sides and bottom of said housing for the detection of incoming radar and laser signals from any directional angle;

a microprocessing group connected with the receiver and positioned in the housing, the microprocessing group being configured for at least identifying signals in the bands of the signals emitted by speed measuring systems;

a power source positioned in the housing and connected to the microprocessing group;

an indicator system connected with the microprocessing group and positioned in the housing, the indicator system being adapted to indicate receiving signals in the bands of vehicular speed measuring systems;

said housing including a vibrating mechanism for providing an identifiable tactile indication to a wearer of said receiver, said vibrating mechanism being also capable of communicating additional warnings, including low battery voltage and discrete vibrations for the detection of laser signals versus radar signals.

2. The detection device of claim 1, wherein the microprocessing group calculates and the indicator system displays the azimuth from the detection device to the speed measuring system.

3. The detection device of claim 1, wherein the microprocessing group calculates and the indicator system displays the distance to the speed measuring system.

4. The detection device of claim 1, wherein an operational mode group is positioned in the housing, the operational mode being selectable between a city mode and a highway mode.

5. The detection device of claim 1, wherein the microprocessing group at least identifies signals in the KA, X, and pulse radar bands and LIDAR laser band.

6. The detection device of clam 1, wherein the housing has a waterproof seal and is configured to operate while being exposed to vehicular vibrations and severe weather environments.

7. A method for detecting speed sensing devices adapted for use with a motorcycle driver comprising the steps of:

placing over an outer garment of a wrist of said motorcycle driver a wrist watch configured detection device adapted for detecting signals from speed measuring systems, the detection device being configured for stand alone operation as a self contained assembly;

preparing the detection device for operation;

using a vibrating mechanism system in said housing to notify the driver that the detection device received signals in at least one band used by speed measuring systems; and said vibrating mechanism also communicating additional warnings, including low battery voltage and discrete vibrations for the detection of laser signals versus radar signals.

8. The method of claim 7, wherein the step of notifying further includes calculating and displaying an azimuth from the vehicular driver to the speed measuring system.

9. The method of claim 7, wherein the step of notifying further includes calculating and displaying a distance from the vehicular driver to the speed measuring system.

* * * * *